US009226036B2

(12) United States Patent
Cloutier

(10) Patent No.: US 9,226,036 B2
(45) Date of Patent: Dec. 29, 2015

(54) SECURE ON-PREMISE GLEANING TO MODIFY AN ELECTRONIC PROGRAM GUIDE (EPG)

(71) Applicant: Pace PLC, West Yorkshire (GB)

(72) Inventor: Jashua Richard Cloutier, Boca Raton, FL (US)

(73) Assignee: PACE PLC, West Yorkshire (GB)

(*) Notice: Subject to any disclaimer, the term of this patent is extended or adjusted under 35 U.S.C. 154(b) by 0 days.

(21) Appl. No.: 14/466,897

(22) Filed: Aug. 22, 2014

(65) Prior Publication Data
US 2015/0082352 A1 Mar. 19, 2015

Related U.S. Application Data

(60) Provisional application No. 61/879,284, filed on Sep. 18, 2013.

(51) Int. Cl.
| | |
|---|---|
| G06F 3/00 | (2006.01) |
| G06F 13/00 | (2006.01) |
| H04N 5/445 | (2011.01) |
| H04N 21/482 | (2011.01) |
| H04N 21/2665 | (2011.01) |

(Continued)

(52) U.S. Cl.
CPC ......... *H04N 21/4826* (2013.01); *H04N 21/251* (2013.01); *H04N 21/25891* (2013.01); *H04N 21/2665* (2013.01); *H04N 21/2668* (2013.01); *H04N 21/44204* (2013.01); *H04N 21/44222* (2013.01); *H04N 21/4532* (2013.01); *H04N 21/4622* (2013.01); *H04N 21/4668* (2013.01)

(58) Field of Classification Search
CPC .............. H04N 21/4826; H04N 21/44204; H04N 21/4532; H04N 21/2665; H04N 21/4668; H04N 21/44222; H04N 21/251; H04N 21/4622; H04N 21/2668; H04N 21/25891
USPC ............ 725/49, 35, 109; 345/156, 157; 707/720, 723
See application file for complete search history.

(56) References Cited

U.S. PATENT DOCUMENTS

| | | | | |
|---|---|---|---|---|
| 6,934,964 B1* | 8/2005 | Schaffer et al. | ............... | 725/46 |
| 8,225,354 B2* | 7/2012 | Acton | ............... | H04N 5/44543 725/48 |

(Continued)

FOREIGN PATENT DOCUMENTS

WO   2008146079 A1   12/2008

OTHER PUBLICATIONS

Nakamura, Y. et al.; "Personalizezd TV-Program recommendations based on Life Log"; 4.1-4; NTT Cyber Solutions Laboratoies, Kanagawa, Japan; IEEE; 2 pgs. 2010.

*Primary Examiner* — Oschta Montoya

(57) ABSTRACT

Methods and systems for providing secure on-premises gleaning to modify an electronic program guide are disclosed. In an embodiment, a method involves receiving, at a network interface, network data traffic and routing the network data traffic between an external network and an internal network and receiving, at a broadcast interface, media content and an electronic programming guide from a media content distributor. The method also involves parsing the network data traffic to glean preference information, providing the preference information to a recommendation engine via a secure local path, and modifying an electronic programming guide to prioritize the media content according to the preference information.

14 Claims, 7 Drawing Sheets

(51) Int. Cl.
*H04N 21/462* (2011.01)
*H04N 21/25* (2011.01)
*H04N 21/258* (2011.01)
*H04N 21/2668* (2011.01)
*H04N 21/442* (2011.01)
*H04N 21/45* (2011.01)
*H04N 21/466* (2011.01)

(56) References Cited

U.S. PATENT DOCUMENTS

| | | | |
|---|---|---|---|
| 8,910,207 B2 * | 12/2014 | Kurita | H04N 21/431 725/40 |
| 2004/0078807 A1 * | 4/2004 | Fries | H04N 21/8586 725/14 |
| 2005/0076364 A1 * | 4/2005 | Dukes et al. | 725/46 |
| 2010/0094866 A1 * | 4/2010 | Cuttner et al. | 707/723 |
| 2010/0251280 A1 * | 9/2010 | Sofos | H04H 60/66 725/14 |
| 2011/0119595 A1 * | 5/2011 | Bydeley | H04N 21/44213 715/738 |
| 2012/0117604 A1 * | 5/2012 | Kisel | G06F 17/30867 725/109 |
| 2013/0081085 A1 * | 3/2013 | Skelton et al. | 725/46 |
| 2014/0259012 A1 * | 9/2014 | Nandlall | H04W 4/003 718/1 |

* cited by examiner

SECURE ON-PREMISE GLEANING TO MODIFY AN ELECTRONIC PROGRAM GUIDE (EPG)

CROSS-REFERENCE TO RELATED APPLICATION

This application claims priority to U.S. Provisional Application Ser. No. 61/879,284, filed Sep. 18, 2013, entitled "SECURE ON-PREMISE GLEANING TO MODIFY AN ELECTRONIC PROGRAM GUIDE (EPG)," which is incorporated herein.

BACKGROUND

Set-top-boxes connect a user's television to a content provider and allow the user to access live television as well as archived television programming and/or movies, music, games, etc. The collection of content available to the user is typically enormous, and oftentimes unwieldy, to the point that the user is unable to find desired content among the available content. The growth of video-streaming over the Internet only exacerbates this issue.

Content providers utilize set-top-boxes with electronic programming guides (EPGs) as a way for the user to navigate the content. The set-top-boxes often have electronic program guides with recommendation engines that provide suggestions of content to the user based on the user's viewing history. The recommendation engine can automatically record shows and channels, and present advertising based on the viewing history. The recommendation engine typically gathers data from input received from a remote control. Generally, the input may be correlated with external sources.

However, with the proliferation of portable communication devices, such as mobile phones, personal digital assistants, etc., and streaming of content over the Internet to these devices, the usefulness of the set-top-box recommendation engine decreases. Although many set-top-boxes are Internet-enabled, the portable devices bypass the set-top-box when accessing the content and therefore information that could be highly relevant to a recommendation goes unused.

SUMMARY

Methods and systems for providing secure on-premises gleaning to modify an electronic program guide are disclosed. In an embodiment, a method involves receiving, at a network interface, network data traffic and routing the network data traffic between an external network and an internal network and receiving, at a broadcast interface, media content and an electronic programming guide from a media content distributor. The method also involves parsing the network data traffic to glean preference information, providing the preference information to a recommendation engine via a secure local path, and modifying an electronic programming guide to prioritize the media content according to the preference information.

An embodiment of a system is also disclosed. The system includes a network interface for routing network data traffic between an external and an internal network and a broadcast interface for receiving media content and an electronic programming guide from a media content distributor. The system also includes a memory device and a processor coupled to the memory device, wherein the memory device stores computer readable program code, which when executed by the processor, causes the processor to parse the network data traffic to glean preference information, provide the preference information to a recommendation engine via a secure local path, and modify the electronic programming guide to prioritize the media content according to the preference information.

A unified home gateway device is also disclosed. The unified gateway device includes a first network traffic interface to an external network, and a second network traffic interface to an internal network, a network router configured to route network data traffic between the external network and the internal network, a broadcast traffic interface configured to receive mass media from a media content provider, and a tuner coupled to the broadcast traffic interface and configured to tune to broadcast channels. The unified home gateway also includes a processor and memory configured to implement a behavior analyzer configured to parse the network data traffic to glean preference information and communicate the preference information to a recommendation engine via a secure local path, wherein the recommendation engine is configured to modify an electronic programming guide to prioritize the mass media according to the preference information.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
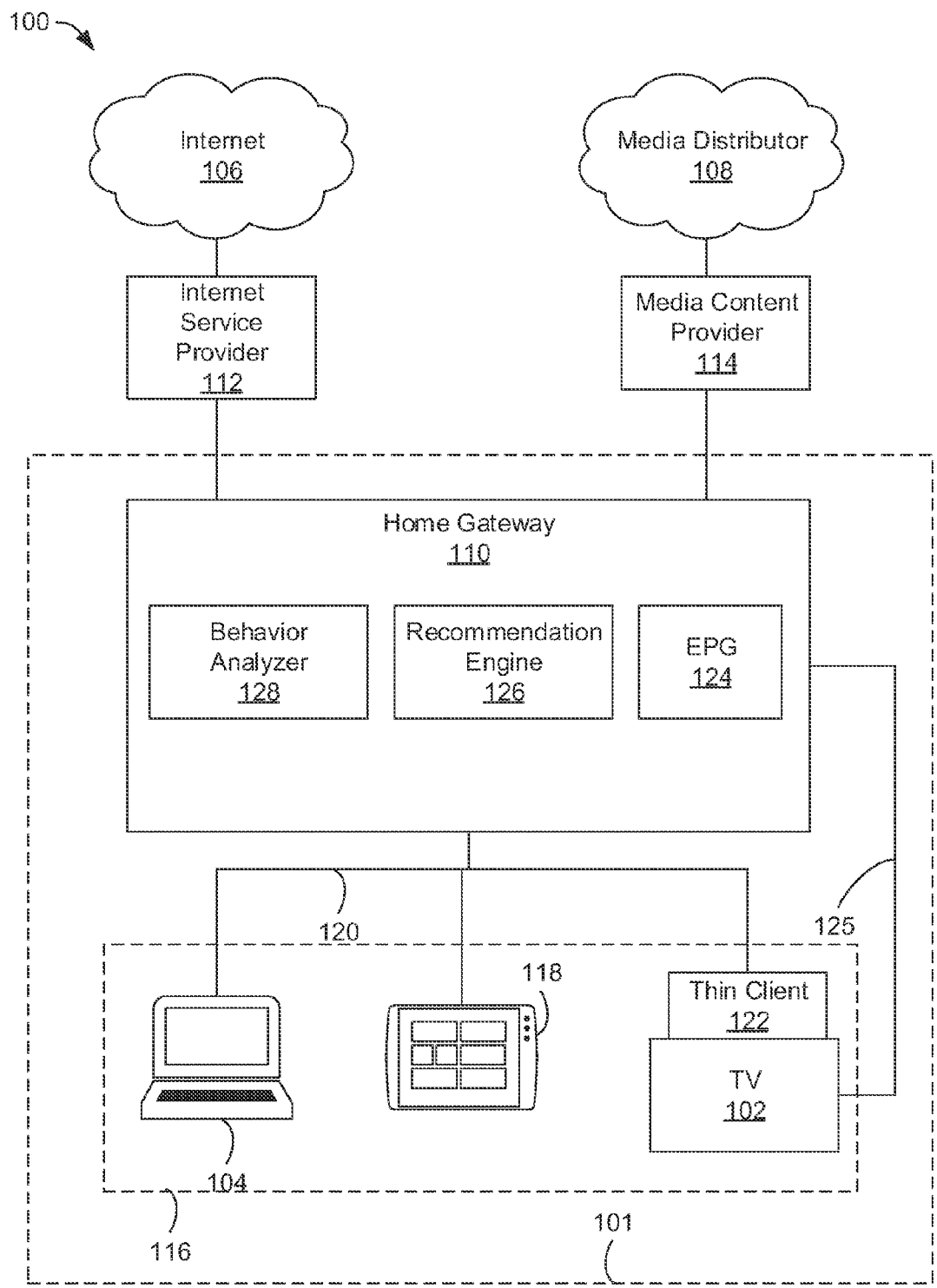
FIG. 1 depicts a schematic diagram of one embodiment of a home media network in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a home gateway in a home media environment. The home gateway represents the convergence of a television set-top-box that accesses television programming and a network router that enables network-capable devices to connect to the Internet. As many Internet service providers (ISPs) also provide television programming, the home gateway, to be described below, is configured to access both the Internet and media content (e.g., live and recorded television programming, music, movies, etc.). The home gateway is configured to parse network traffic to glean preference information and to use the preference information to make recommendations in an electronic program guide (EPG) based on the network traffic. As used herein, the phrase "network traffic" refers to data traffic encapsulated in network packets that is communicated over a computer network (e.g., Internet traffic). Beneficially, the home gateway communicates the preference information over a secure local path without exposing the information to an external third party server outside of the home. Accordingly, the home gateway provides a secure and private environment in which to perform network traffic analysis. Stated differently, because the home gateway can perform network traffic parsing to glean user preference information such as interest categories and to make programming recommendations based on the gleaning without sending the preference information or the raw data from which the preference information was determined to a server over the Internet, the user's preference information is more secure and Internet usage remains private. Additionally, the burden of analyzing, potentially, millions of users is offloaded to the user's home gateway.

In an embodiment, the home gateway is configured to glean user preference information by generating user profiles. As used herein, the term "glean" refers to extracting preference information from network traffic by identifying keywords/metadata associated with the network traffic. For example, if a user browses to a sports news website, the gleaned keywords/metadata values may be "basketball," "football," etc. The keywords (hereinafter broadly referred to as "metadata" and "metadata values") may be grouped together into categories. A category may contain a single metadata value. Each user profile includes metadata values and corresponding scores (e.g., a frequency of metadata value occurrence) by monitoring network traffic of a user and correlating the metadata values with keywords in the network traffic. The home gateway, in one example, includes a network interface for routing network traffic between an external and an internal network, and an interface for receiving media content from a media content distributor. The home gateway is also configured to communicate the user profile to a recommendation engine, identify content based on the user profile, and modify an electronic programming guide based on the user profile.

FIG. 1 depicts a schematic diagram of one embodiment of a network architecture 100 for delivering various types of media to a home 101. The network architecture 100, as depicted, includes various devices and components for delivering content to a user. The content, as used herein, may refer to any type of information including, but not limited to, information delivered via a television 102 or a computer 104. Furthermore, the content may be presented visually and/or aurally. The content may originate from a server coupled with a global communications network such as the Internet 106. The content may also originate from a media distributor 108.

The network architecture 100 may include, in one embodiment, a home gateway 110. An Internet service provider 112 communicatively couples the home gateway 110 with the Internet 106. The Internet service provider 112 is configured to provide services such as Internet access, Internet transit, mailbox service, etc., to users of the network architecture 100. The Internet service provider 112 may provide access to the Internet 106 via various protocols and technologies. Examples include, but are not limited to, digital subscriber line (DSL), integrated services digital network (ISDN), fiber to the home (FTTH), Ethernet, wireless access, etc. The home gateway 110, as will be described in greater detail below, is configured with at least one interface for communicating with the Internet service provider 112. For example, the home gateway 110 may include a DSL interface for communicating with the Internet service provider via twisted-pair wiring.

The home gateway 110 is also configured to communicate with a media content provider 114. The media content provider 114, in one embodiment, is a mass media provider. In other words, the media content provider 114 distributes (e.g., via broadcast and/or narrowcast) mass media from media distributors 108 to users of the network architecture 100. The media content provider 114 is capable of providing access to broadcast media such as radio, recorded music, film, and television. Additionally, the media content provider 114 may be configured to provide digital representations of physical objects such as print media (e.g., newspapers, books, etc.). The media content provider 114, in one embodiment, provides access to media content via coaxial cables. Accordingly, the home gateway 110 may be configured with a coaxial cable interface for communicating with the media content provider via a satellite dish or a cable headend. In an alternative embodiment, the home gateway 110 may be configured with an interface for receiving content via, for example, twisted-pair cable, fiber, etc. In yet another embodiment, the home gateway 110 may be configured to receive wireless signals via an attached antenna.

The home gateway 110 is configured to distribute content from the Internet 106 or the media distributor 108 to content presentation devices 116. These devices include, but are not limited to, computers 104, portable electronic devices 118, and televisions 102. Each of the devices 116 may be network-enabled and configured to communicate with the home gateway 110 via a local area network 120. Examples of portable electronic devices 118 include, but are not limited to, laptops, tablets, mobile telephones, electronic organizers, smartphones, personal digital assistants, communicators, etc. The home gateway 110, in one embodiment, connects the local area network (LAN) 120 with both a wide area network (WAN) (i.e., the Internet 112) and the media distributor 108. In this manner, the home gateway 110 is a "unifier" of Internet access and mass media. Stated differently, the home gateway 110 is a single housing that contains the inputs and outputs to connect to both the ISP 112 and the media content provider 114. The LAN 120 is configured to communicate signals with the devices 116 via wired or wireless connections. In a further embodiment, the LAN 120 is a hybrid local area network that is formed with both wired and wireless network segments that are bridged by the home gateway 110.

A traditional television 102 may be configured to communicate over the local area network 120 by way of a thin client 122. The thin client 122, in one embodiment, is configured to access content and information from other servers, computers, etc., on the local area network 120. For example, the thin client 122 may be configured to retrieve an electronic program guide (EPG) 124 from the home gateway 110 for presentation on the television 102. In an alternative embodiment, the thin client 122 may be embedded into a television controller board for example, or may attach to the television 102 by way of an expansion port on the television 102. Stated differently, the thin client 122 may be external to the television 102, or integrated into the television 102. The television may also communicate with the home gateway 110 via an audio-visual cable 125 such as, but not limited to, coaxial cable, HDMI cable, etc., in a manner similar to that of a traditional set-top-box.

The home gateway 110 is configured to generate the EPG 124 based on media content that is available from the media content provider 114. The EPG 124 may include a listing of "channels" that are representative of different media distributors. Examples of media distributors include, but are not limited to, NBC®, ABC®, CBS®, FOX®, etc. Each channel may correspond to a set of content provided by a radio station, a television station, a music station, etc. Each channel may provide content that changes over time according to a schedule. The home gateway 110 is also configured to generate "channels" in the EPG 124 that contain content available from the Internet 106. Examples of content available over the Internet 106 include, but are not limited to, streaming audio-visual content, podcasts, downloads, Internet radio, video clips, audio books, etc.

As can be imagined, collecting all of the various types of content to the EPG 124 results in a very large number of channels, however, the home gateway 110 is provided with a recommendation engine 126 that is configured to identify channels and content relevant to a user. The recommendation engine 126 is configured to communicate with a behavior analyzer 128 to identify content that is relevant to the user. The behavior analyzer 128 is configured to analyze content consumption by the user and develop a profile based on user input, as will be described below.

Figure 2:
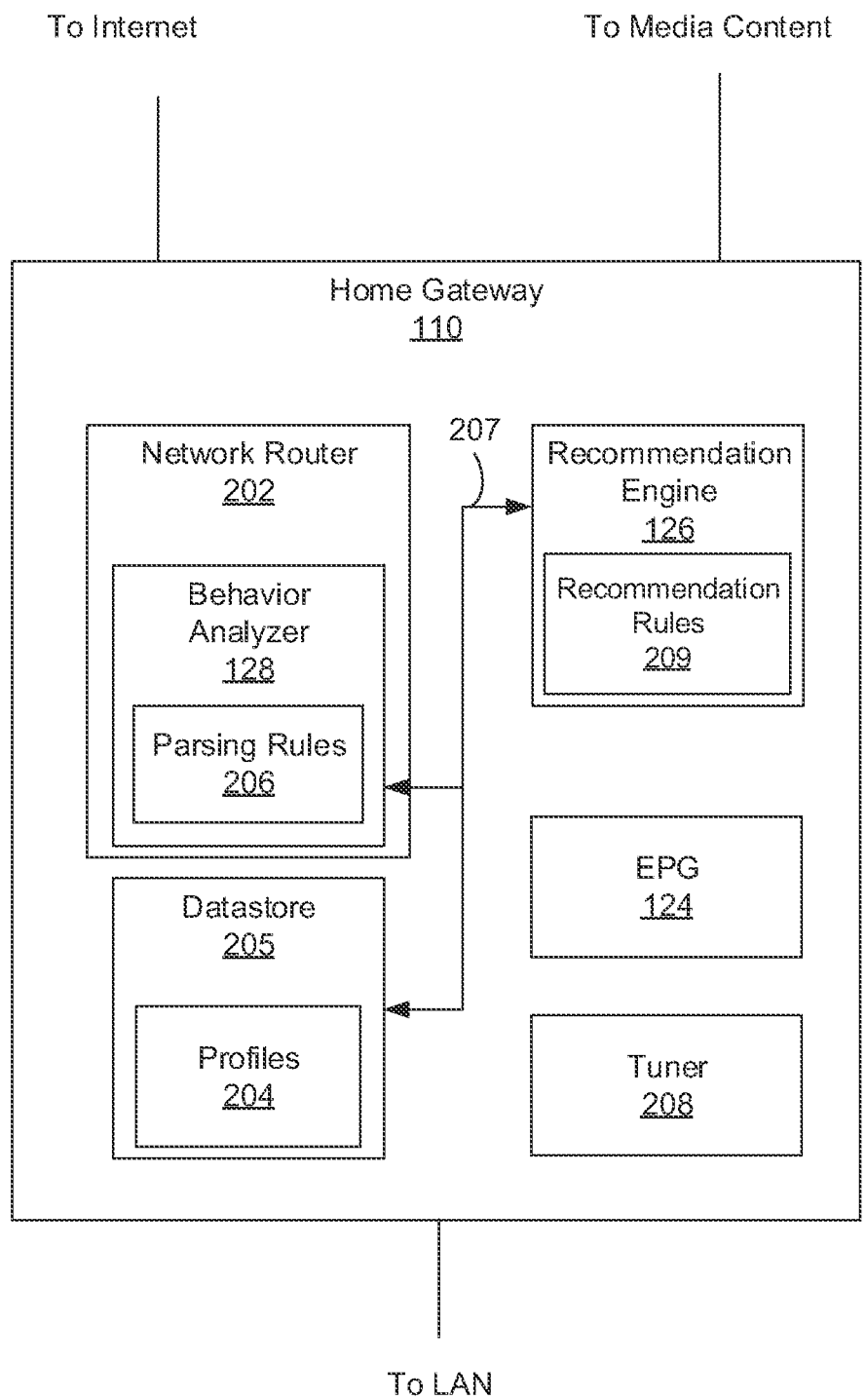
FIG. 2 is a schematic block diagram illustrating one embodiment of the home gateway in accordance with an embodiment of the invention.

FIG. 2 is a schematic block diagram illustrating one embodiment of the home gateway 110 in accordance with embodiments of the invention. The home gateway 110 may be configured to unify in a single device the access to content that is available from both the Internet and media distributors. The home gateway 110 is configured to function, therefore, as both a home Internet router and a television set-top-box and is often referred to as a "unified home gateway." The home gateway 110 includes a network router 202 configured to forward data packets from an external network (e.g., the Internet) to an internal network (e.g., the LAN).

The network router 202 functions to direct network traffic from devices on the internal network to servers available across the Internet. The home gateway 110, in one embodiment, is similar in appearance to a standard set-top-box. In other words, the home gateway 110 may be formed as a housing having inputs for connecting to the Internet service provider 112 and to the media content provider 114. The inputs may be in the form of copper cables (e.g., rj45 and/or rj11), fiber, or coaxial (e.g., rg6). The home gateway 110 also includes at least one tuner 208 for tuning to specific channels provided by a media content provider 114, where the distribution is by cable and/or satellite and/or terrestrial broadcast. The home gateway 110, in one embodiment, may be positioned near a television in a user's house, or alternatively, near a cable distribution panel. The home gateway may have dimensions in the range of, for example, between about 2 and 6 inches tall, 2 and 14 inches wide, and 2 and 14 inches deep.

In one embodiment, the home gateway 110 includes the behavior analyzer 128, as described above. The behavior analyzer 128 is configured to analyze a user's media consumption and to develop a user profile 204. The user profiles 204 may be stored in a secure location within the home gateway 110. In one embodiment, the secure location is a datastore 205. The datastore 205 may be any computer readable storage device, such as, but not limited to, hard disk drives, flash memory devices, etc. As will be discussed in greater detail below, the information in the user profiles 204 may be communicated with the recommendation engine 126 over a secure local path 207. The secure local path 207 may comprise an internal bus (i.e., wire path, optical path, wireless connection, software protocol, etc.) that does not communicate outside of the home 101. Furthermore, the secure local path 207 may be configured to encrypt communications between the behavior analyzer 128, the datastore 205, and the recommendation engine 126. In a further embodiment, which will be described with reference to FIG. 4, the secure local path 207 may be implemented over a local area network.

In a further embodiment, the behavior analyzer 128 is configured to analyze multiple users and generate a user profile 204 for each user. As used herein, the term "user" refers to a person using either a network-capable device on the LAN 120, and/or a person consuming media via a media player (e.g., television 102, or other media presentation device including stereos, portable media players, etc.) The behavior analyzer 128 is configured to determine the interests of each user by analyzing input from each user. In one example, the behavior analyzer 128 monitors input received from a remote control. In other words, when a user selects a certain program, the behavior analyzer 128 records the selection.

The behavior analyzer 128 may correlate the selection with $3^{rd}$ party data, such as Nielsen ratings. The $3^{rd}$ party data may include information, such as metadata, related to a viewed program. Accordingly, the behavior analyzer 128 may populate the profile 204 of the user with metadata of television programs watched. For example, if the user tends to watch sporting events, the behavior analyzer may populate the profile with metadata such as "basketball," "baseball," player names, etc. Each time the user watches a program with metadata values that coincide with previously obtained metadata of a previously watched program, the behavior analyzer 128 increases a counter (e.g., score) associated with the metadata value, as will be described in greater detail below with reference to FIG. 3.

The behavior analyzer 128 is also configured to monitor network traffic while creating or updating the profile 204 of the user. For example, the behavior analyzer 128 is configured to monitor Internet browsing habits by performing deep packet inspection. A network packet is a formatted unit of data transmitted across a network. Packets generally consist of control information and user data (e.g., the payload). In an embodiment, the behavior analyzer 128 may be configured to analyze either part of the packet to determine interests of users by analyzing IP addresses, domain names, HTTP info, etc. The behavior analyzer 128 is configured to examine the packets of web requests to determine what type of traffic the packets relate to, and to determine the origin and destination of the packets. By analyzing which web sites the user visits, the behavior analyzer 128 can identify preference information such as interests, associate metadata with those interests, and correspondingly update the profile of the user with the metadata. For example, if the behavior analyzer 128 identifies that a user searches for a specific term, the behavior analyzer 128 is configured to determine that the user has a strong interest in the searched for subject. In other words, the behavior analyzer 128 adds the searched for term to the user profile and assigns a score (e.g., increases the counter) to the term that indicates the searched for term is of greater importance than other interests gleaned from the network traffic.

To filter the web traffic for useful information, the behavior analyzer 128 may be configured with a predetermined set of parsing rules 206. Alternatively, the behavior analyzer 128 may be configured to receive parsing rules 206 from a server or other network-connected device. In a further embodiment, the behavior analyzer 128 is configured to retrieve parsing rules 206 from the media content provider 114. As such, the media content provider may determine how metadata is gleaned from a user's network traffic. The parsing rules 206 may specify how the behavior analyzer 128 treats specific packets. In other words, the parsing rules 206 instruct the behavior analyzer 128 to analyze or skip a packet. One example of a rule 206 may state "if a packet is designated to an external server targeting port 80 and the request URL is for a news website, track the category of news (e.g., sports, politics, etc.), and update the profile." Another example of a rule 206 might state "if a packet is designated to a search engine, track the search term and update the profile."

In another embodiment, the behavior analyzer 128 is configured to analyze a web site to identify metadata associated with the content of the website. For example, the behavior analyzer 128 may be configured to analyze the URL of a requested website. If the requested URL contains information such as "category=," the behavior analyzer 128 is configured to identify the category and update the profile 204 with metadata associated with the category. In one embodiment, the behavior analyzer may give a greater score or weight to a search term than a category term, for example. In a further embodiment, the behavior analyzer may parse a website to identify keywords and associate the keywords with metadata which may then be added to the user profile 204.

Various different parsing rules 206 may be created to analyze the internet usage of the user. Traffic other than HTTP traffic (e.g., web browsing) helps develop the profile 204 of the user. For example, the behavior analyzer 128 may be configured to analyze protocols other than HTTP traffic in determining interests of the user. Stated differently, traffic destined for specific ports known to be associated with an online game may be indicative of the user's interest in playing the online game. Traffic associated with email, instant messaging, etc., may also be analyzed. The behavior analyzer 128 may be configured to simultaneously process a packet against the different rules, and if a match is found, update the profile 204.

Over time, URL patterns may change, new popular web sites are launched, and new categories of content are created. Accordingly, the behavior analyzer 128 is configured to update the parsing rules 206 by, for example, retrieving new rules from an external source, such as a server operating within the media content provider 114. One example of a rule for monitoring Pinterest® categories of interest is as follows:

```
PORT=80
FLOW_DIRECTION=out
URL_MATCH=pinterest.com/all/
URL_GET_VAR_EXTRACT=category
INTEREST_THRESHOLD=3 times in a week
INTEREST_VALUE=Content of URL_GET_VAR_EXTRACT
```

In a further embodiment, the behavior analyzer 128 is configured to identify distinct users based upon packet inspection. The behavior analyzer 128 may be configured to associate packet targets and/or destinations with specific users. For example, the behavior analyzer 128 identifies email addresses or other types of identifying information, and associates that user with a specific target/destination (e.g., IP address on the local area network, device MAC address, etc.). Subsequently, the behavior analyzer 128 associates any further packets intended for the specific target/destination with the specific user, and updates the profile for that user. Accordingly, the behavior analyzer 128 may generate profiles for different users of the network architecture 100.

The behavior analyzer 128 is configured to communicate the interests of the users to the recommendation engine in a secure manner over, for example, a local bus with the unified home gateway. In an embodiment, the behavior analyzer 128 communicates the profiles 204 to the recommendation engine over a secure local bus. One example of an individual user profile 204 is described below with reference to FIG. 3. The secure communication of analysis data may be communicated to the recommendation engine 126 via TCP/IP or UDP, or internal bus. If the behavior analyzer 128 resides on a separate device from the recommendation engine 126, the analysis data may be communicated over the local network 120, as will be discussed in greater detail below. The analysis data may be sent from the behavior analyzer 128 to the recommendation engine as periodic updates which may occur at any frequency (ever 5 seconds, every 5 days etc.). Profile data may be sent to the recommendation engine 126 as either an update or as a complete set of information.

The recommendation engine 126 is configured to modify the EPG 124 based on the profiles 204 to include and/or prioritize relevant content. In one embodiment, the recommendation engine 126 prioritizes content by highlighting the content. Other examples of prioritizing content include, but are not limited to, grouping together relevant content, automatically recording the relevant content, etc. The content may include television shows, movies, video-on-demand, advertisements, etc. The modifications, based on recommendations from the recommendation engine 126, are targeted based on the metadata of the profile. For example, if the behavior analyzer 128 has learned that the user enjoys soccer, the recommendation engine is configured to alter the EPG 124 to include upcoming soccer matches.

The recommendation engine 126 may also recommend that an entire channel be added or promoted to a more prominent position in the EPG 124. In another embodiment, the recommendation engine 126 may alter the content that is currently being displayed to display content that is more relevant. For example, the recommendation engine 126 may change the channel to a channel the user may like based on the profile 204. The recommendation engine 126 is configured to correlate metadata information with channel information. In particular, if the profile 204 indicates that the user visits CNN.com frequently, the recommendation engine 126 may change the channel being displayed to CNN. In another example, the recommendation engine 126 instructs a digital video recorder (DVR) to automatically record content for later viewing. The above described recommendations function equally well to target advertisements at the user based on the profile 204.

In one embodiment, the recommendation engine 126 is configured to retrieve, or otherwise acquire, recommendation rules 209 from a media content provider 114 (see FIG. 1). The recommendation rules 209 identify how preference information identified by the behavior analyzer 128 may be used to match the preference information to media content. For example, the keywords/metadata identified by the behavior analyzer 128 may identify that a user is interested in New England Patriots football games. Therefore, a recommendation rule 209 may instruct the recommendation engine 126 to modify the EPG 124 to highlight upcoming Patriots' games. In a further embodiment, a second recommendation rule 209 may instruct the recommendation engine 126 to highlight any football game in the EPG 124. The recommendation rules 209 may be updated to include further rules, for example, a rule that identifies other television content that contains people related to the New England Patriots organization. For example, if the quarterback of the team also starred in a reality television show, the recommendation rules 209 may instruct the recommendation engine 126 to highlight that reality television show.

In the depicted embodiment, the home gateway is illustrated as having separate interfaces for the network data (i.e., from the "Internet") and the broadcast content (i.e., from the "Media Content"). In another embodiment, the home gateway 110 may be configured with a single combined interface for sending and receiving information to/from the Internet and a media content provider. The combined interface, for example, comprises both a network data interface and a broadcast interface. In this example, the combined interface is configured to communicate with so-called "triple play" or "quadruple play" service providers. Triple and quadruple play service refers to the provisioning, over a single interface, of multiple services such as Internet access, television services, and telephone services. In this example, the home gateway 110 is configured to receive both network data traffic and broadcast content over the combined interface, and then separate the combined traffic and route the combined traffic to the intended destination (e.g., computer, smartphone, television, etc.).

Figure 3:
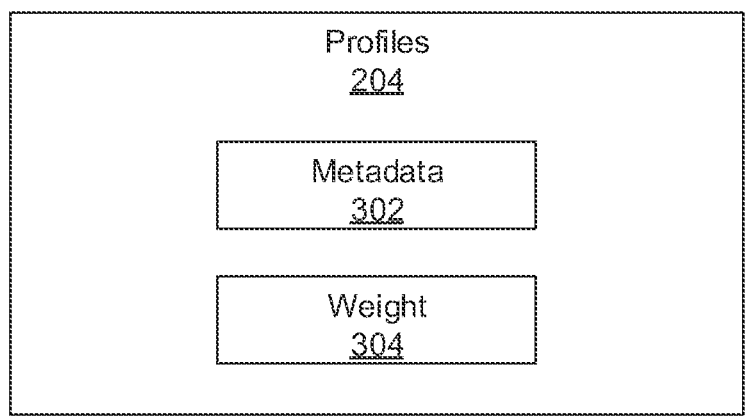
FIG. 3 is a schematic block diagram illustrating one embodiment of a profile in accordance with embodiments of the invention.

FIG. 3 is a schematic block diagram illustrating one embodiment of a profile 204 in accordance with embodiments of the invention. Although a single profile 204 is illustrated, it is contemplated that the home gateway 110 may maintain multiple profiles 204. In particular, the home gateway 110 may maintain a profile 204 for each user that uses the network architecture 100 of FIG. 1. Alternatively, the home gateway 110 is configured to receive user information regarding the number of users, for example, in the family. In other words, the home gateway 110 may be configured to present a user-interface, and receive through the interface, information indicative of the number of users. The behavior analyzer 128 is configured to identify different users based on identifying information associated with each user. Examples of identifying information includes, but is not limited to, specific personal devices (e.g., smartphone), email addresses detected in network traffic, login names, MAC addresses of devices, etc.

In one embodiment, each profile contains metadata 302 corresponding to interests of the user. The behavior analyzer 128 identifies interests through monitoring of network traffic and/or monitoring of content viewed. For simplicity, only a single metadata value 302 is depicted. The behavior analyzer 128 may be configured to assign a weight 304 or score to each metadata value 302.

In one embodiment, each occurrence of a metadata value 302 causes the behavior analyzer 128 to increment the score or weight 304 of the metadata value 302. Accordingly, an interest of the user that is frequently searched or viewed has a weight 304 greater than other metadata values 302. In another embodiment, the behavior analyzer 128 may assign different weight 304 values based on the type of the occurrence of the metadata 302. For example, a term searched in a search engine may be given a greater weight 304 than a keyword in the middle of a web page. Stated differently, the weight 304 calculation may vary based on how the metadata 302 was inferred and where the metadata 302 came from. Additionally, if the user frequently browses the web page (e.g., three times a week) with the described keyword, the weight associated with the keyword will increase, while the search term entered only one time may be disregarded.

The profile 204 may be in any form including, but not limited to, XML, JSON, CSV, HTML, etc. Metadata values 302 may be assigned for categories, web sites, explicit interests etc. One example of a profile 204 could be as follows:

```
<?xml version "1.0"?>
<DATA>
<ITEM type="WEB_SITE" sub_type="URL" category="cnn.com" count="15" span="7days" score="240"/>
<ITEM type="CATEGORY" category="VIDEO GAME" score="735"/>
<ITEM type="CATEGORY" category="TATOO" score="130"/>
 <ITEM type="EXPLICIT_INTEREST" text="pickup truck" score="815"/>
</DATA>.
```

Figure 4:
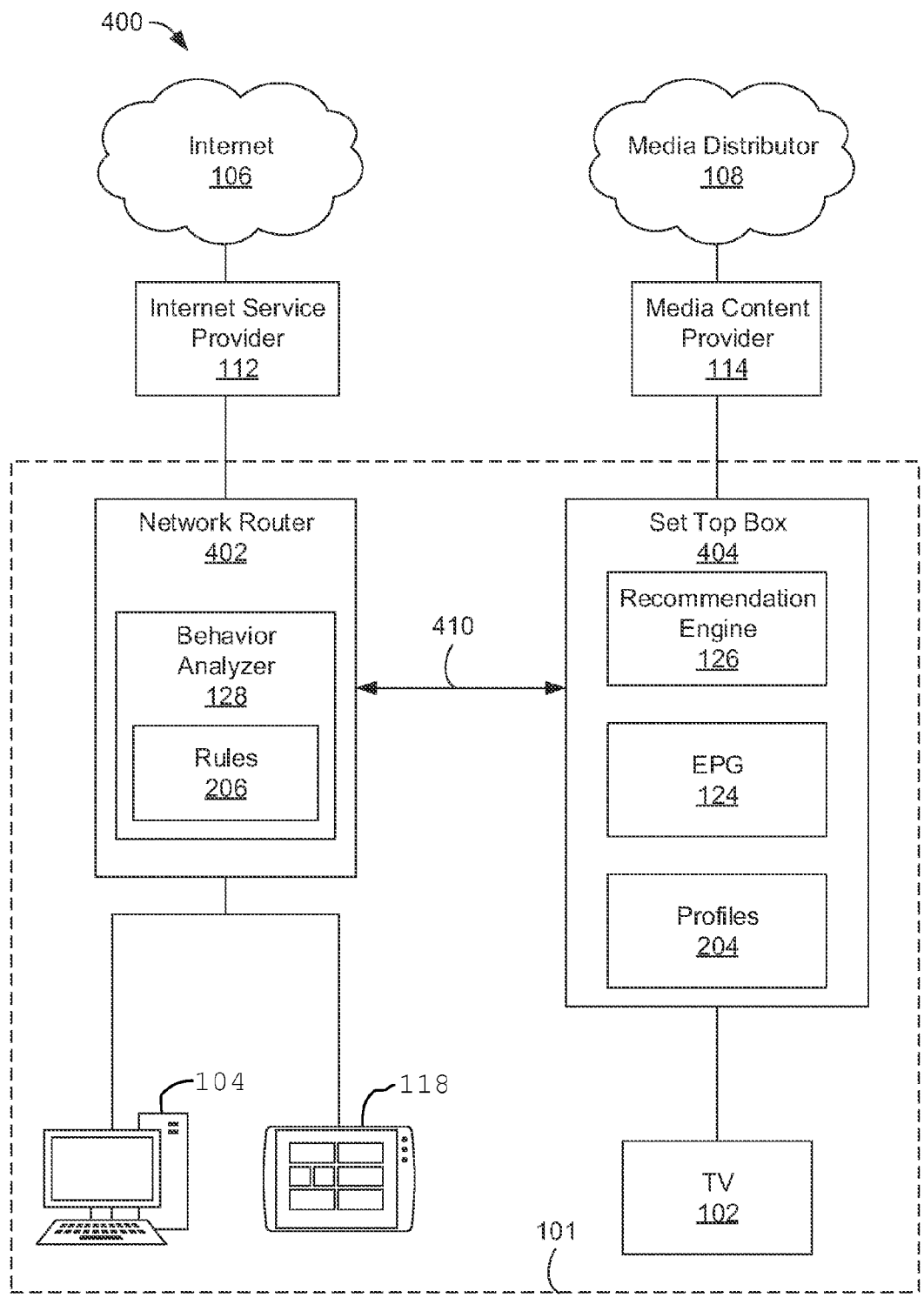
FIG. 4 is a schematic block diagram of another embodiment of a home media network in accordance with an embodiment of the invention.

FIG. 4 is a schematic block diagram of a network 400 in accordance with an embodiment of the invention. The depicted embodiment illustrates a behavior analyzer 128 operable on a device that is separate from the recommendation engine 126 (e.g., not in the same unified home gateway). The behavior analyzer 128 may be configured to operate on a network router 402. The network router 402 may be a standard network router having firmware that has been modified to include the behavior analyzer 128.

Similarly, the set top box 404 may be a standard set top box having firmware that has been modified to include the recommendation engine 126. The behavior analyzer 128 and the recommendation engine 126 may be configured to communicate in a secure manner over the local LAN 410, or alternatively, over another wired or wireless connection. Communication between the behavior analyzer 128 and the recommendation engine 126 may be encrypted, or alternatively, transmitted in plain text. The behavior analyzer 128 and the recommendation engine 126 of FIG. 4 operate in a manner substantially similar to that described above with reference to FIGS. 1-3. Beneficially, both the network router 402 and the set top box 404 are located within the home 101, and as such, any information gleaned from the analysis of a user's network traffic is only communicated within the home 101, between the behavior analyzer 128 and the recommendation engine 126 so that the security and privacy of the information is maintained within the home 101.

Figure 5:
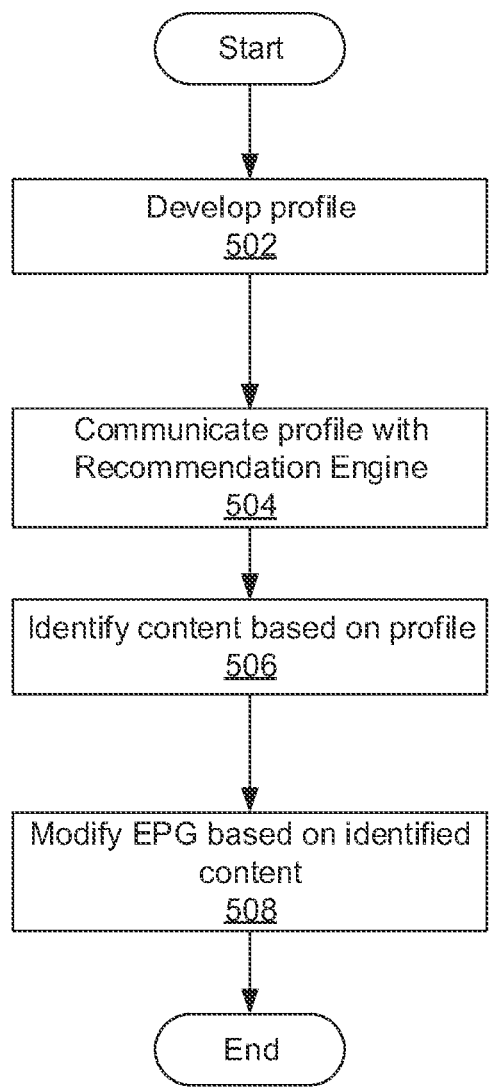
FIG. 5 depicts a flowchart diagram of one embodiment of a method for making content recommendations based on Internet traffic.

FIG. 5 depicts a flowchart diagram of one embodiment of a method 500 for making content recommendations based on Internet traffic. Although the method 500 is described in conjunction with the network architecture 100 of FIG. 1, embodiments of the method 500 may be implemented with other types of networks and configuration systems.

The method 500 starts and the behavior analyzer 128 develops 502 a user profile. In one embodiment, the behavior analyzer 128 develops a user profile by monitoring the Internet traffic of the user. In a further embodiment, the behavior analyzer 128 may analyze web traffic and media consumption (e.g., TV watching) to create the user profile. The behavior analyzer 128 identifies metadata values based on the Internet traffic and assigns a score to each metadata value. The metadata values may be weighted according to type, or alternatively, according to frequency of access (e.g., how many times a webpage is visited), or frequency of occurrence (e.g., how many times a keyword exists in a webpage).

The behavior analyzer 128 then communicates 504 the profile with the recommendation engine 126. This communication of the profile may occur according to a predetermined schedule, or alternatively, the behavior analyzer 128 may transmit the profile every time the profile is updated.

The recommendation engine 126 identifies 506 relevant content based on the profile. The recommendation engine 126 may compare the metadata values of the profile with a $3^{rd}$ party metadata database. The database may facilitate matching content to the profile based on matching content metadata and/or by matching the profile to the content consumption of others who have a similar profile. The recommendation engine 126, accordingly, may identify related content based on the metadata values and weights. In one embodiment, the recommendation engine 126 identifies at least one television show, for example, that has a matching metadata value.

The recommendation engine 126 then modifies 508 the EPG based on the identified content. In one embodiment, the recommendation engine 126 modifies 508 the EPG by adding "favorite" channels, rearranging the channels of the EPG, highlighting channels, etc. In other words, the recommendation engine 126 performs an operation to draw the user's attention to the related content. In another embodiment, the recommendation engine 126 may record related content automatically and present the recorded content to the user. The method 500 then ends.

Figure 6:
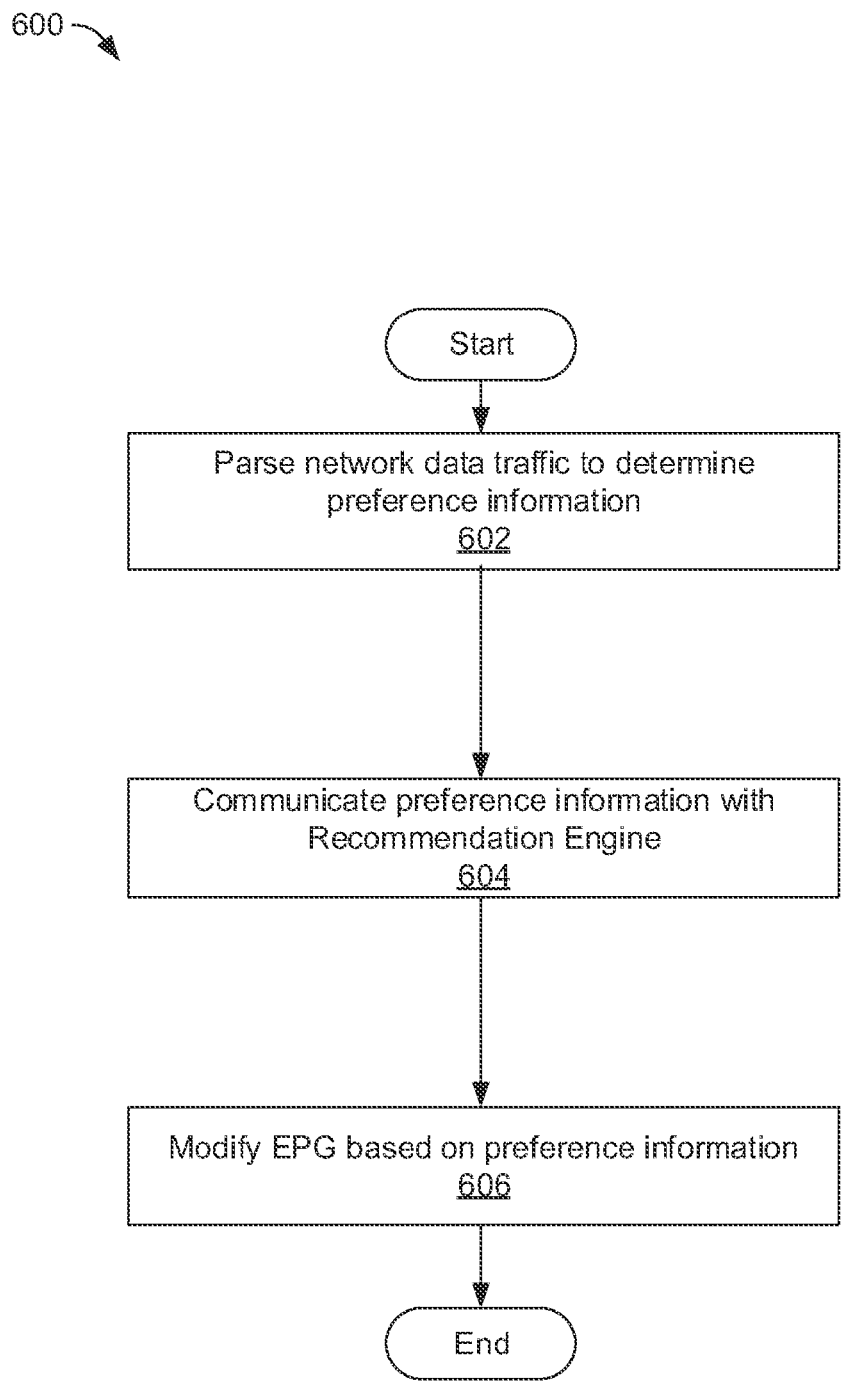
FIG. 6 depicts a flowchart diagram of another embodiment of a method for making content recommendations based on Internet traffic

FIG. 6 depicts a flowchart diagram of another embodiment of a method 600 for making content recommendations based on Internet traffic. Although the method 600 is described in conjunction with the network architecture 100 of FIG. 1, embodiments of the method 600 may be implemented with other types of networks and configuration systems.

The method 600 starts and the behavior analyzer 128 parses network data traffic to determine preference information. In one embodiment, the behavior analyzer 128 determines preference information by capturing keywords and/or metadata according to the description above with reference to FIGS. 1-3. The preference information may include categories of user interests such as, but not limited to, sports, politics, music, etc.

Figure 7:
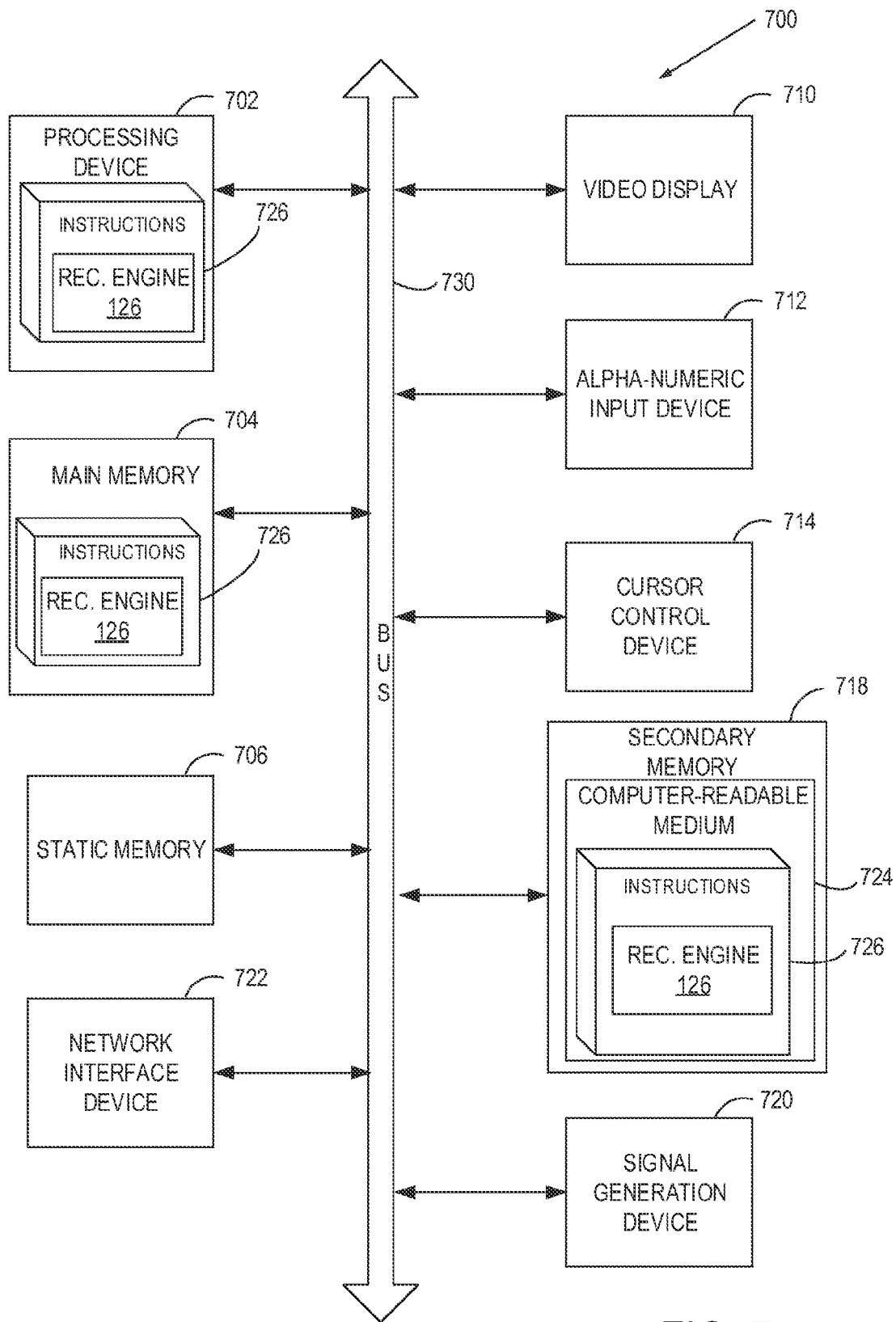
FIG. 7 is a diagram of one embodiment of a computer system for facilitating a unified home gateway.

The behavior analyzer then communicates 604 the preference information to the recommendation engine via a secure local path (e.g., bus 730 of FIG. 7). Accordingly, personal information about a user does not transmit over any external network, and is therefore secure.

The recommendation engine may identify media content based on the preference information, and modify 606 the EPG based on the preference information. In one embodiment, the recommendation engine 126 modifies 606 the EPG by adding "favorite" channels, rearranging the channels of the EPG, highlighting channels, etc. In other words, the recommendation engine 126 performs an operation to draw the user's attention to the related content. In another embodiment, the recommendation engine 126 may record related content automatically and present the recorded content to the user. The method 600 then ends.

FIG. 7 is a diagram of one embodiment of a computer system for facilitating a unified home gateway. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a secondary memory 718 (e.g., a data storage device in the form of a drive unit, which may include fixed or removable computer-readable storage medium), which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the instructions 726 for performing the operations and steps discussed herein.

The computer system 700 may further include a network interface device 722, and other interface devices including, but not limited to, video capture interfaces using coaxial cable, twisted-pair cable, or digital cables such as HDMI. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 718 may include a machine-readable storage medium (or more specifically a computer-readable storage medium) 724 on which is stored one or more sets of instructions 726 embodying any one or more of the methodologies or functions described herein. In one embodiment, the instructions 726 include instructions for the recommendation engine 126. The instructions 726 may also reside, completely or at least partially, within the main memory 704 and/or within the processing device 702 during execution thereof by the computer system 700, the main memory 704 and the processing device 702 also constituting machine-readable storage media.

The computer-readable storage medium 724 may also be used to store the instructions 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 726, components and other features described herein can be implemented as discrete hardware components or integrated in the functionality of hardware components such as ASICS, FPGAs, DSPs or similar devices. In addition, the instructions 726 can be implemented as firmware or functional circuitry within hardware devices. Further, the instructions 726 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "generating," "receiving," "parsing," "identifying," "recording," "accessing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
 receiving, at a network interface, Internet traffic and routing the Internet traffic between the Internet and a local area network (LAN);
 receiving, at a broadcast interface, media content and an electronic programming guide from a media content distributor;
 parsing the Internet traffic to glean preference information;
 providing the preference information to a recommendation engine via a local path, the local path comprising at least one of an internal bus and the LAN; and
 modifying the electronic programming guide to prioritize the media content according to the preference information;
 wherein the preference information comprises categories of user interests, and the method further comprises generating a user profile for a user, wherein the user profile comprises the gleaned categories of user interests, determined by identifying keywords in the network data Internet traffic, and a score corresponding to each of the gleaned categories of user interests;
 further comprising storing the user profile in a datastore connected with the local path;
 wherein parsing the Internet traffic to glean preference information comprises performing deep packet inspection on the Internet traffic to glean preference information.

2. The method of claim 1, further comprising acquiring a plurality of parsing rules via the broadcast interface to identify the preference information.

3. The method of claim 1, further comprising receiving a plurality of recommendation rules to identify the media content that corresponds to the preference information.

4. The method of claim 1, further comprising receiving, at a combined interface, the Internet traffic and the media content, wherein the combined interface comprises the network interface and the broadcast interface.

5. A system comprising:
 a network interface for routing Internet traffic between the Internet and a local area network (LAN);
 a broadcast interface for receiving media content and an electronic programming guide from a media content distributor;
 a memory device;
 a processor coupled to the memory device, wherein the memory device stores computer readable program code, which when executed by the processor, causes the processor to:
 parse Internet traffic received at the network interface to glean preference information;
 provide the preference information to a recommendation engine via a local path, the local path comprising at least one of an internal bus and the LAN; and
 modify the electronic programming guide to prioritize the media content according to the preference information;
 wherein the preference information comprises categories of user interests, and wherein the system is further configured to generate a user profile for a user, wherein the user profile comprises the gleaned categories of user interests, determined by identifying keywords in the Internet traffic, and a score corresponding to each of the gleaned categories of user interests;
 wherein the system is further configured to store the user profile in a datastore connected with the local path;
 wherein parsing the Internet traffic to glean preference information comprises performing deep packet inspection on the Internet traffic to glean preference information.

6. The system of claim 5, wherein the system is further configured to acquire a plurality of parsing rules via the broadcast interface to identify the preference information.

7. The system of claim 5, wherein the system is further configured to receive a plurality of recommendation rules to identify the media content that corresponds to the preference information.

8. The system of claim 5, wherein the system is further configured to receive, at a combined interface, the Internet traffic and the media content, wherein the combined interface comprises the network interface and the broadcast interface.

9. The system of claim 5, wherein the system is further configured to prioritize the media content by adding identified media content to the electronic programming guide.

10. A unified home gateway device comprising:
 a first network traffic interface to the Internet, and a second network traffic interface to a local area network (LAN);
 a network router configured to route Internet traffic between the Internet and the LAN;
 a broadcast traffic interface configured to receive mass media and an electronic programming guide from a media content provider;
 a processor and memory configured to implement:
 a behavior analyzer configured to parse the Internet traffic to glean preference information and communicate the preference information to a recommendation engine via a local path within the unified gateway device; and
 wherein the recommendation engine is configured to modify the electronic programming guide to prioritize the mass media according to the preference information;
 wherein the preference information comprises categories of user interests, and wherein the unified home gateway device is further configured to generate a user profile for a user, wherein the user profile comprises the gleaned categories of user interests, determined by identifying keywords in the Internet traffic, and a score corresponding to each of the gleaned categories of user interests;
 further comprising a datastore connected with the local path, the datastore configured to maintain the user profile;
 wherein parsing the Internet traffic to glean preference information comprises performing deep packet inspection on the Internet traffic to glean preference information.

11. The unified home gateway device of claim 10, wherein the unified home gateway device is further configured to acquire a plurality of parsing rules via the broadcast interface to identify the preference information.

12. The unified home gateway device of claim 10, wherein the unified home gateway device is further configured to receive a plurality of recommendation rules to identify the media content that corresponds to the preference information.

13. The unified home gateway device of claim 10, wherein the unified home gateway device is further configured to receive, at a combined interface, the Internet traffic and the media content, wherein the combined interface comprises the first network interface and the broadcast interface.

14. The unified home gateway device of claim 10, further comprising a tuner coupled to the broadcast traffic interface and configured to tune to broadcast channels.

* * * * *